US00RE38718E

(19) United States
(12) Reissued Patent
Futamura

(10) Patent Number: US RE38,718 E
(45) Date of Reissued Patent: Mar. 29, 2005

(54) EMBROIDERY DATA CREATING DEVICE

(75) Inventor: Masao Futamura, Nagoya (JP)

(73) Assignee: Brother Kogyo Kabushiki Kaisha, Nagoya (JP)

(21) Appl. No.: 09/793,651

(22) Filed: Feb. 27, 2001

Related U.S. Patent Documents

Reissue of:
(64) Patent No.: 5,880,963
Issued: Mar. 9, 1999
Appl. No.: 08/705,336
Filed: Aug. 29, 1996

(30) Foreign Application Priority Data

Sep. 1, 1995 (JP) ..... 7-224965
Apr. 24, 1996 (JP) ..... 8-102286

(51) Int. Cl.[7] ..... G06F 19/00; D05C 5/02; D05B 21/00

(52) U.S. Cl. ..... 700/138; 112/102.5; 112/470.01; 112/470.04; 112/475.19; 382/111; 382/258

(58) Field of Search ..... 700/136–138; 112/102.5, 475.19, 475.18, 470.01, 470.04, 470.06; 382/111, 258

(56) References Cited

U.S. PATENT DOCUMENTS 4,982,674 A * 1/1991 Hayakawa ..... 112/102.5
5,054,408 A * 10/1991 Hayakawa ..... 112/475.19
5,179,520 A * 1/1993 Hayakawa ..... 700/138
5,181,176 A * 1/1993 Hayakawa ..... 700/138
5,231,941 A * 8/1993 Wakayama ..... 112/102.5
5,270,939 A 12/1993 Goldberg et al. ..... 700/138
5,283,748 A * 2/1994 Muramatsu ..... 700/138
5,311,439 A * 5/1994 Hayakawa et al. ..... 700/138
5,335,182 A 8/1994 Asano ..... 700/138
5,379,707 A * 1/1995 Asano ..... 112/102.5
5,390,126 A 2/1995 Kongho et al. ..... 700/138
5,422,819 A 6/1995 Nakamura et al. ..... 700/135
5,474,000 A 12/1995 Micuno et al. ..... 112/102.5
5,499,589 A * 3/1996 Kyuno et al. ..... 112/102.5
5,558,033 A * 9/1996 Futamura et al. ..... 112/475.19
5,740,056 A * 4/1998 Futamura ..... 700/137
5,751,583 A * 5/1998 Kyuno et al. ..... 700/138
5,839,380 A * 11/1998 Muto ..... 112/102.5
6,192,292 B1 * 2/2001 Taguchi ..... 700/138
6,356,648 B1 * 3/2002 Taguchi ..... 382/111

FOREIGN PATENT DOCUMENTS

JP 3-128085 * 5/1991
JP 4-174699 * 6/1992
JP 5-49766 * 3/1993
JP 7-236784 9/1995
JP 7-328255 12/1995
JP 8-38756 * 2/1996

* cited by examiner

*Primary Examiner*—Paul P. Gordon
(74) *Attorney, Agent, or Firm*—Oliff & Berridge, PLC

(57) ABSTRACT

Disclosed is an embroidery data creating device for creating an embroidery data to be used by a sewing machine. In the embroidery data creating device, an image data, which consists of a plurality of pixel data, corresponding to a line-drawn image is converted into a thin line image, and then closed paths are determined with use of 8-connection method. After embroidery attribution is applied to a path and/or a region defined by each closed path, the paths and/or the regions are converted into the embroidery data.

21 Claims, 13 Drawing Sheets

EMBROIDERY DATA CREATING DEVICE

Matter enclosed in heavy brackets [ ] appears in the original patent but forms no part of this reissue specification; matter printed in italics indicates the additions made by reissue.

BACKGROUND OF THE INVENTION

The present invention relates to an embroidery data creating device for processing an outline data of an original image to create an embroidery data corresponding to the original image.

Presently, there are data creating devices that create embroidery data for use with industrial sewing machines. These data creating devices are computer controlled and are capable of creating high-accuracy embroidery data in a relatively short period of time. Usually these data creating devices are provided with a computer, an image scanner, a hard disk drive, and a CRT (Cathode Ray Tube) display, etc.

Recently, as the performance of personal sewing machines has improved, an embroidery data creating device for use with the personal sewing machine has been sought to satisfy an expanding demand. However, the data creating devices for the industrial sewing machines are complicated, expensive, and are not easy to operate for personal use. Therefore, an inexpensive, easily operable data creating device has been desired. Preferably, such devices are capable of creating embroidery data based on an original, e.g., a freehand line-drawn image drawn on a sheet of paper.

The conventional embroidery data creating devices do not have such a function, and therefore the operator traces an image, which is scanned by the image scanner and displayed on the CRT, with a mouse or the like. Alternatively, a digitizer or the like to create the digital data of the image to the computer should be used. In order to create the high-accuracy embroidery data for stitching a good looking embroidery, a plurality of paths of stitching, and closed regions to be filled with stitches as well as their positions and shapes should be input to the computer.

An embroidery data creating device, which automatically creates the embroidery data, for personal use was disclosed in Japanese Patent Provisional Publication HEI4-174699. The disclosed data creating device is provided with a microcomputer, a small display device, and a keyboard. The device is connected with a monochrome (e.g. black and white) image scanner, and creates the embroidery data as described below.

In this device, firstly the original image is scanned with use of the scanner. Then the scanned image is displayed on the display device. If the displayed image have the desired shape, the embroidery data corresponding to the displayed image is created.

In the embroidery data creating devices of the former type, the operator is required to designate a path of each stitch of the embroidery or to trace the displayed image manually and accurately. It is time consuming, and the larger the image is, the longer time is consumed.

In the embroidery data creating devices of the latter type, the embroidery data creating devices usually deal with a colored image, and do not have a function of processing an outline image or the line-drawn image. Therefore, the embroidery data crating devices of the latter type cannot create sufficient embroidery data, and accordingly the beautiful embroidery may not be produced with use of the embroidery data created based on the line-drawn image.

That is, in order to have threads filled in areas defined by the outlines of an image, besides the data for the outlines, another data for the filled portion should be prepared separately. Therefore, in the latter devices, if a line-drawn image is used as an original data, it is difficult to have sufficient embroidery data.

Generally, there are two methods for dealing with an image pattern, i.e., for scanning the image pattern to generate an image data, and creating the embroidery data based on the image data. First one is to obtain a bit map image by scanning an original image. Then stitching points are determined based on the bit map image. The other one is to pick up an outline data (path data) by scanning the image pattern.

Assume that an image shown in FIG. 16A is to be dealt with (i.e., is to be scanned and then an embroidery data is to be created). With use of the former method, scanning of the image can be achieved relatively easily. However, the stitch usually has only one predetermined direction, and therefore, if the embroidery data creating in accordance with the former method is used for producing the actual embroidery, the produced embroidery would be as shown in FIG. 16B, and the good looking embroidery may not be obtained. Further, in this method, it is difficult to obtain the data indicating application of various methods of stitching to improve an appearance of the embroidery. In order to avoid this problem, a complicated geometric analysis should be made when the image is scanned, and practically it is almost impossible.

According to the latter method, the outline of the image pattern is obtained according to an edge detection algorithm. Since the outlines defining the regions are obtained, the embroidery data for an region defined by the obtained outline data can be made relatively easily. However, if a region defined by an outline has an elongated shape, it is difficult for a processor (e.g., a CPU) to recognize the direction in which the region is elongated. Generally, when a region is to be filled with a thread, the direction of stitching is fixed. If the elongated direction of the region can be determined, it may be possible to change the stitching direction in accordance with the elongated direction. However, since the elongated direction of the region is not easy to obtaine, the fixed direction is to be referred to in order to create the embroidery data for such a region. As a result, if the stiching direction is not appropriate for such an elongated region, the embroidery produced in accordance with the embroidery data created with use of the fixed stitching direction may not be sufficiently beautiful (see portions "NG" in FIG. 16B). To avoid the problem, various algorithms for automatically determining the direction of the stitch have been suggested. However, sufficient result is not obtained yet, and further a large amount of calculation is required in such algorithms. Therefore, the latter method is not applicable to the inexpensive personal use embroidery data creating device.

Further, even if the image pattern to be scanned is an outline image like coloring pictures for children, when it is scanned by the scanner, the obtained image data of the outline has a certain width (i.e., the line is recognized as a two-dimensional area). Therefore, when the image data is processed and the edge of the outline is detected, two outlines are detected at the both ends of the image of the outline as indicated in FIG. 16C. Since the outline is recognized as an area, even if the original is a line-drawn image, it is difficult to assign various method of stitching a line such as a run-stitch, a zigzag stitch, an E stitch and the like.

Therefore, it is not preferable to detect a plurality of lines (i.e., paths of stitching) for a single outline as described above. Preferably, only one path for one line of the original line-drawn image is to be obtained. For this demand, a thinning method which is known as one of the image data processing methods can be used. If a thin line obtained in the thinning method is used as a line defining the path of stitching, the run-stitch, the zigzag stitch, the E stitch and the like can be freely applied (see FIG. 16D). For example, the width of the zigzag can easily be set and/or adjusted if the single thin line is used for defining the paths and/or regions of the embroidery.

SUMMARY OF THE INVENTION

It is an object of the invention to provide an embroidery data creating device capable of creating an embroidery data based on a simple line-drawn original image pattern, and assigning various types of stitching to the paths and regions. Note that a region of the image pattern can be represented with a single path automatically without requiring an operator to trace the line-drawn image manually.

For the above object, according to the invention, there is provided an embroidery data creating device for creating an embroidery data to be used by a sewing machine, the embroidery data creating device comprising means for storing an image data corresponding to a line-drawn image, means for obtaining a thin line image based on the image data, means for determining closed paths based on the thin line image, means for selecting at least one of a path and a region defined by the path for each of the closed paths determined by the determining means, and means for converting the at least one of the path and the region defined by the path into the embroidery data.

Optionally, the converting means comprises means for assigning an attribution to the at least one of the path and the region defined by the path when conversion is executed.

The attribution may be a type of stitch, a color of thread, a pitch of each stitch, a density of stitches and/or a direction of stitch for embroidering.

Further optionally, the image data is a bit map image data may consist of data for a plurality of pixels, and a pixel connectivity of the thin line obtained by the obtaining means is four or eight.

Furthermore, the determining means may convert the thin line image into a chain of connected vectors, the closed path being defined as a path surrounded by the chain of connected vectors.

Still optionally, the embroidery data creating device may store the embroidery data in a memory means. In this case, the memory means can be a detachable card memory.

DESCRIPTION OF THE ACCOMPANYING DRAWINGS

DESCRIPTION OF THE EMBODIMENTS

Figure 1:
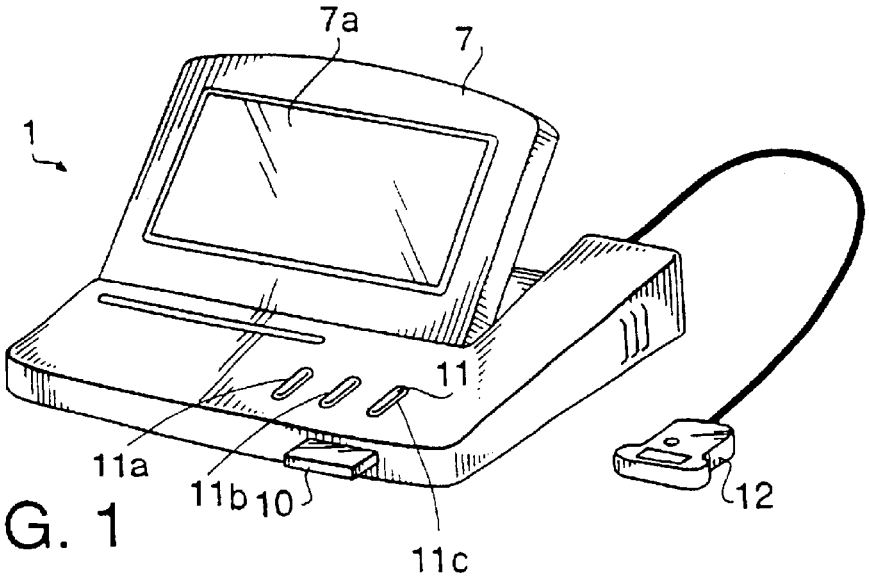
FIG. 1 shows an appearance of an embroidery data creating device, according to an embodiment of the present invention.
Figure 2:
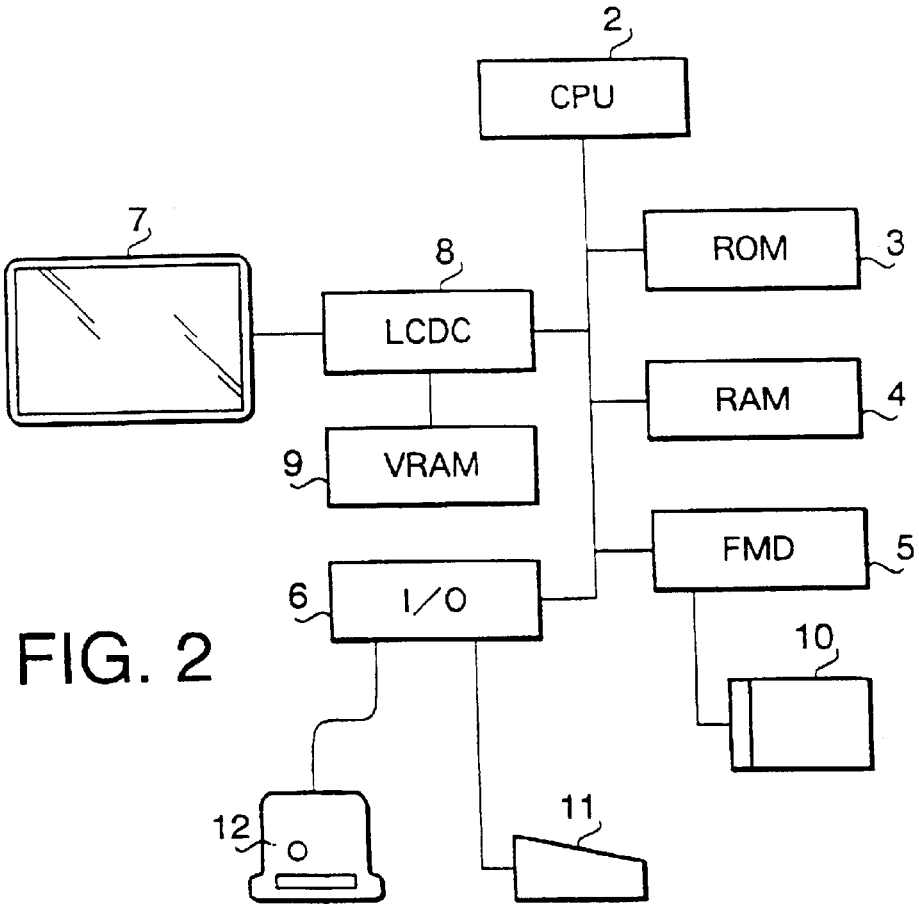
FIG. 2 is a block diagram of the embroidery data creating device shown in FIG. 1.

FIG. 1 shows an embroidery data creating device 100 according to a preferred embodiment of the present invention. FIG. 2 shows a block diagram of the embroidery data creating device shown in FIG. 1.

Figure 3:
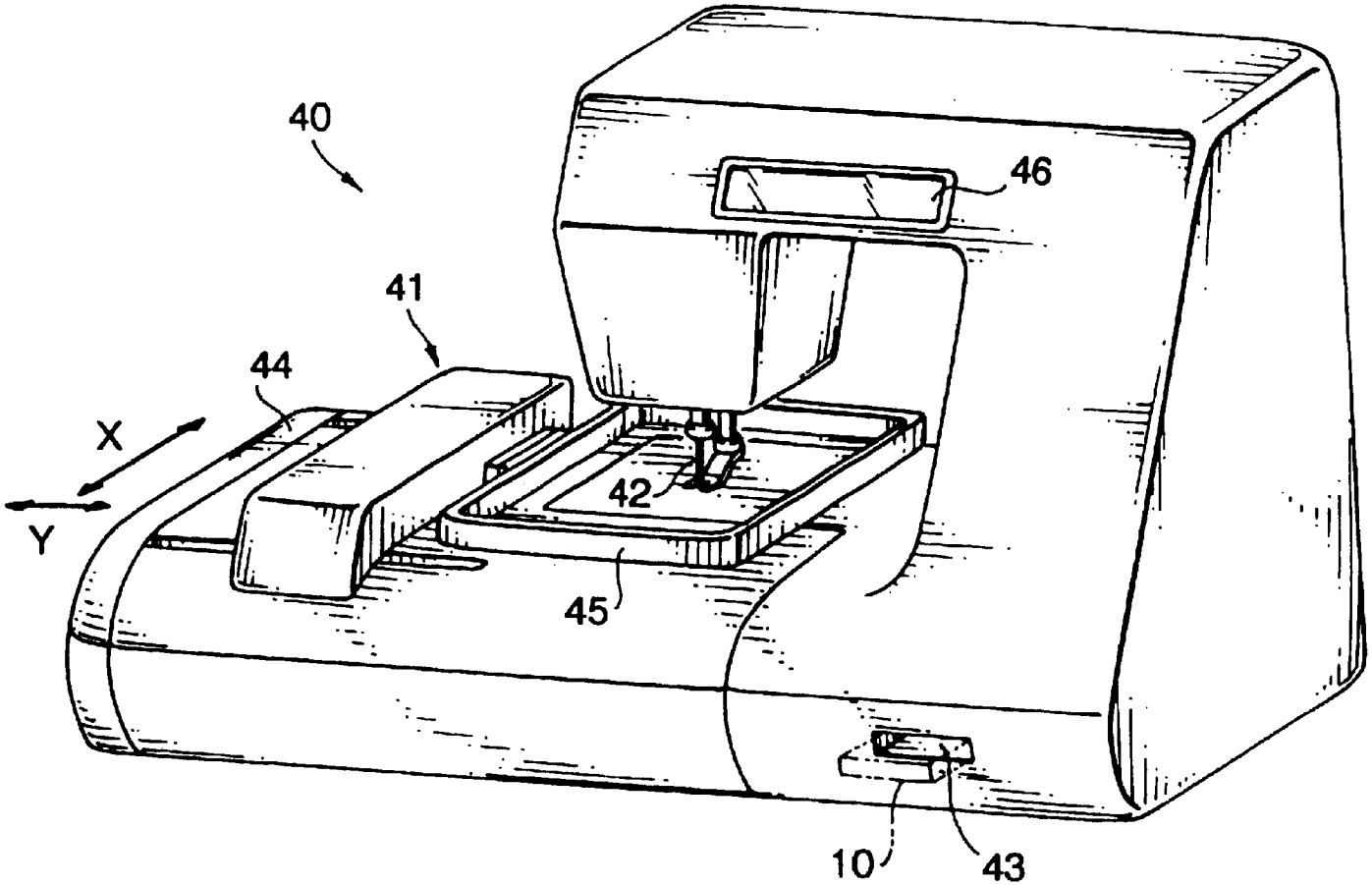
FIG. 3 shows a sewing machine which uses the embroidery data created by the embroidery data creating device.

The data created by the embroidery data creating device 100 is used in a personal sewing machine, an example of which is shown in FIG. 3.

In FIG. 3, an embroidery sewing machine 40 is constructed such that a cloth is moved in X and Y directions by a horizontal moving mechanism 41. An embroidered pattern is formed on the cloth by stitching thread (moving the needle) while the cloth is being moved in X and Y directions.

The sewing operation and the driving operation of the horizontal driving mechanism 41 are controlled by a microcomputer built in the sewing machine 40 (not shown). The sewing machine 40 has a card insertion unit 43 to which a card memory (flash memory) 10 is to be inserted. The embroidery data is supplied from the card memory 10. Since the embroidery data indicates the amount of movement in X and Y directions for every stitch, the embroidered pattern can be automatically produced (sewn). The embroidery data creating device according to the present invention creates the data to be stored in the card memory 10.

As shown in FIG. 1, the embroidery data creating device 100 has a main body 1 and an image scanner 12 connected to the main body 1. The top surface of the main body 1 has an LCD (liquid crystal display) 7. The LCD 7 has a screen 7a for displaying a scanned image scanned by the scanner 12, and the embroidery areas. A flash memory device 5 is provided on the front side surface of the main body 1. The flash memory 10, which is used as a recording medium of the embroidery data is detachably inserted into the flash memory device 5. Further, operation keys 11 for inputting selection and/or commands is provided on the top surface of the main body 1. In the embodiment, there are three operation keys: a region change key 11a; a fill stitch setting key 11b; and a path stitch setting key 11c.

As shown in FIG. 2, the embroidery data creating device 100 has a CPU 2, a ROM 3, a RAM 4, the flash memory device 5, and an I/O interface 6, which are connected with each other through a bus line. A VRAM 9 is connected to an LCD controller (LCDC) 8 which controls the display on the screen 7a in accordance with a bit-map stored in the VRAM 9. Under the control of the LCD controller 8, the LCD 7 displays a monochrome (black and white) image on the screen 7a thereof. The image scanner 12 is connected to the CPU 2 through the I/O interface 6.

The image scanner 12 is a monochromatic hand-held scanner that is moved by an operator across an image to be scanned. When the reading section of the scanner 12 faces the image, and is moved along a certain direction while a reading button is depressed, the scanner 12 scans the image and creates binarized (ON or OFF) bit map image data. The binarized data is stored in a image data storing area 4a of the RAM 4 as a raster formatted bit-map having a value of 0 when a corresponding pixel is white, and a value 1 when a corresponding pixel is black.

Figure 4:
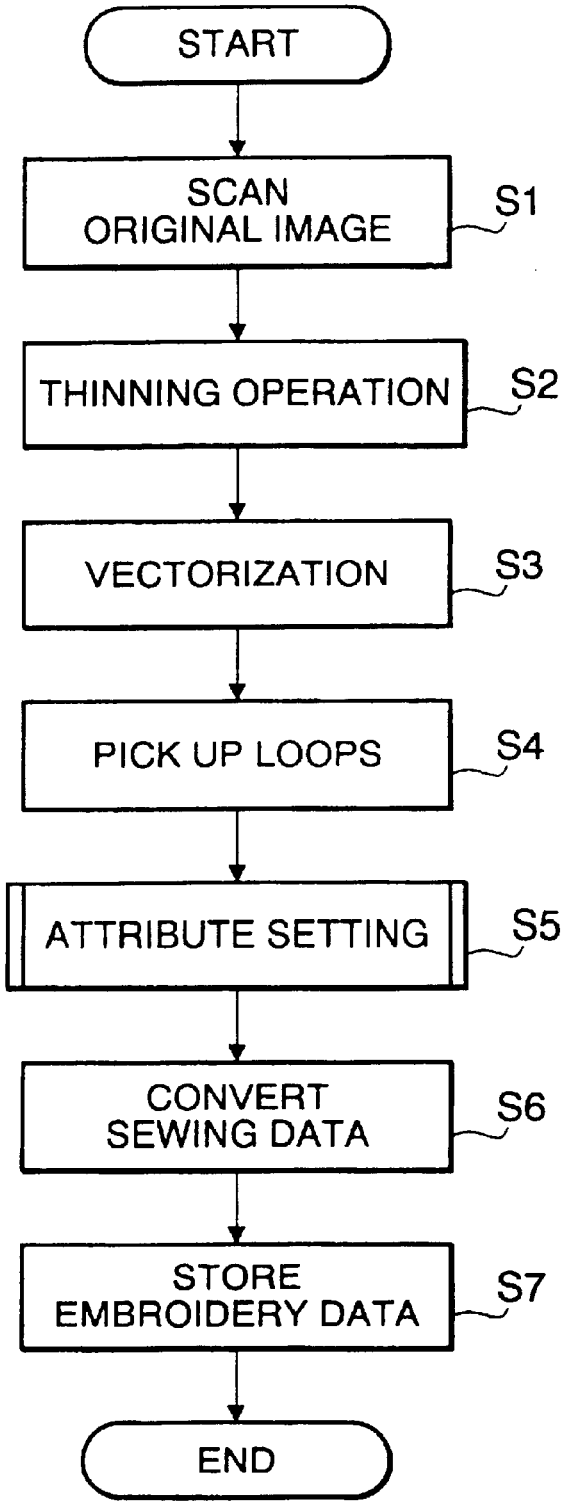
FIG. 4 is a flowchart illustrating an operation for creating the embroidery data.
Figure 5:
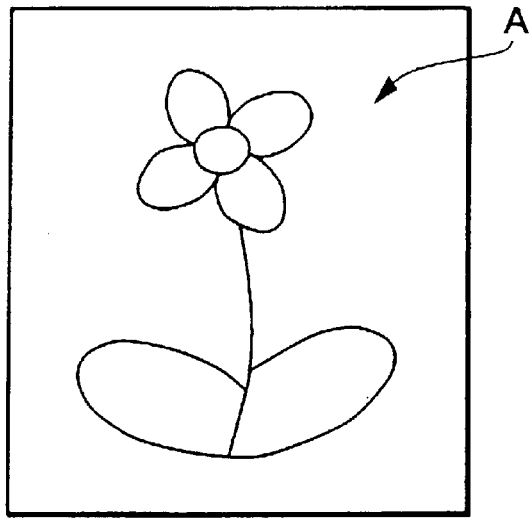
FIG. 5 shows an example of an original pattern for creating the embroidery data.

The embroidery creating device 100 creates the embroidery data based on the original as shown in FIG. 5. The data creating operation is stored in the ROM 3 as a program. The operation will be illustrated with reference to a flowchart shown in FIG. 4. Prior to the data creating operation, an operator prepares an original as shown in FIG. 5. The original is a line-drawn image pattern which is drawn, for example, with use of a black pen on a sheet of white paper.

The process shown in FIG. 4 starts when the operator operates a predetermined key on the main body 1. After the process of FIG. 4 has started, the original image pattern A shown in FIG. 5 is read with use of the scanner 12. The binarized bit map image data of the image pattern A is stored in the image data storing area 4a of the RAM 4.

Figure 6:
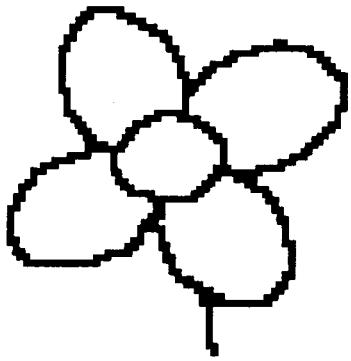
FIG. 6 shows a bit map image corresponding to the scanned data.

FIG. 6 is an image corresponding to the binarized image data stored in the image data storing area 4a of the RAM 4. The image shown in FIG. 6 consists of a plurality of black square pixels indicative of digitized image pixels. The black squares correspond to the data having value "1" in the image data storing area 4a.

In step S2, the thinning operation is applied to the binarized image data stored in the image storing area 4a of the RAM 4 to create a thin line image data corresponding to the image pattern A shown in FIG. 5. As described before, and as shown in FIG. 6, the outline of the bit map image directly produced by scanning the original image pattern has a certain width (i.e., more than one pixel are arranged in the width direction of the outline of the bit map image shown in FIG. 6). Therefore, the bit map data is not dealt with as a data indicative of a single line. The thinning operation executed at step S2 enables the data creating device 100 to deal with the image pattern A as a pattern formed with lines.

As practical methods for achieving the thinning of the binarized bit map image, a plurality of methods are well-known. For example, a sequential thinning method is known. According to the sequential thinning method, firstly a closed region is defined as a region in which black pixels are connected with each other. Then, pixels located at the outer side portion of the closed region are sequentially deleted according to a predetermined rule until no more pixels can be deleted. The rule for deleting the pixel will not be described in detail since there are various methods which are all well-known. Any method can be taken if the width of the line is reduced to one pixel. One well-known example of such methods is a Hilditch method which converts the closed region consisting of a plurality of connected black pixels into an 8-connected line.

Figure 7:
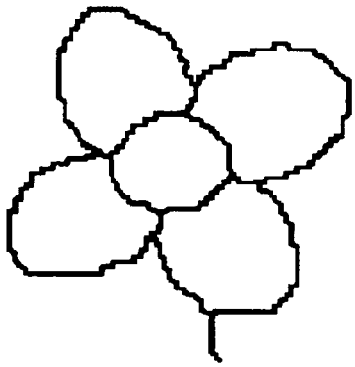
FIGS. 7 shows a bit map image corresponding to the image data to which the thinning operation is applied.

FIG. 7 shows a part of the line image converted from the binarized bit map image with used of the thinning operation. In FIG. 7, the 8-connected line image is shown.

At step S3, the line-drawn image corresponding to the image pattern A is converted into chains of line data respectively having lengths and direction. That is, the line-drawn image is converted into a set of short vector data (i.e., vectorization is executed) at S3. As a method of vectorization, for example, a pixel (any pixel) forming the line-drawn image is determined to be a starting point, and by sampling another pixel along the line forming the line-drawn image, a vector is obtained. As another example, a reference vector is determined, and by evaluating the difference between the reference vector and a certain point, significant points can be determined.

An example of the vectorization is disclosed in the Japanese Patent Provisional Publication HEI 8-38756, and detail description will not be provided here.

Figure 8:
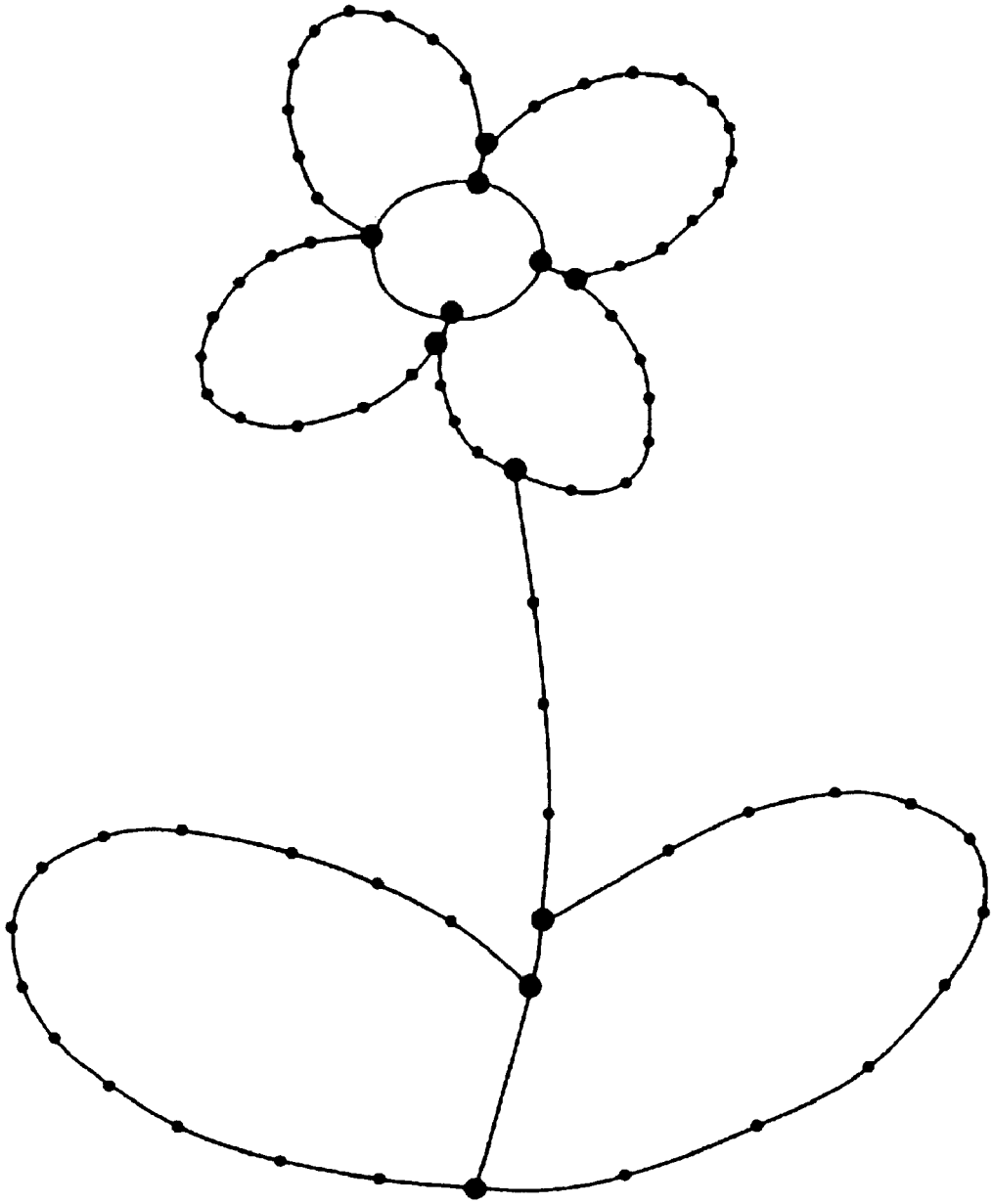
FIG. 8 shows an example of a short vector data.
Figure 9A:
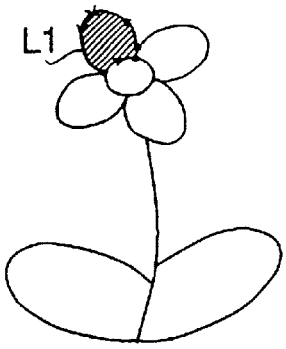
FIGS. 9A through 9G show selection of loops based on the thin line image.
Figure 9B:
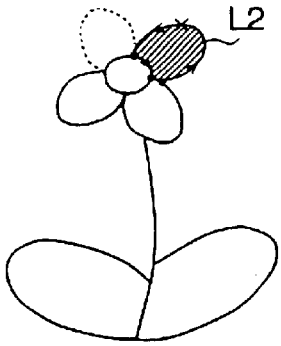
Figure 9C:
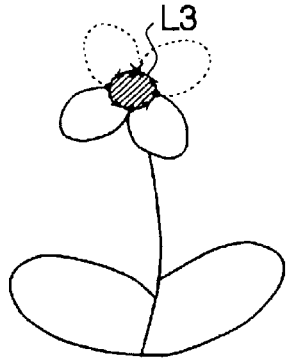
Figure 9D:
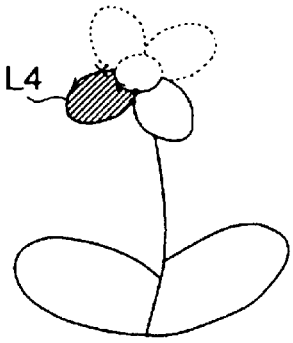
Figure 9E:
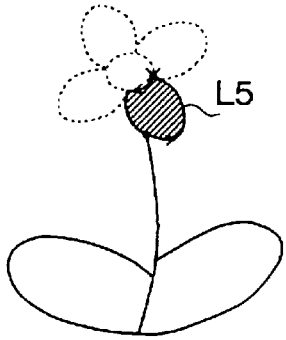
Figure 9F:
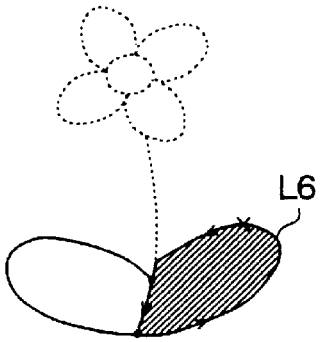
Figure 9G:
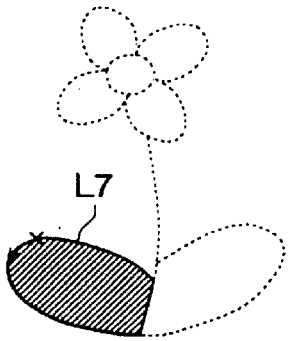

FIG. 8 is an example of the short vector data. In the drawing, big black dots are diverging points where more than two short vectors are connected, and small black dots represent structural points where end points of two short vectors are connected. By executing step S3, the shape of the original image pattern A is expressed as a two dimensional graph consisting of short vectors.

In step S4, based on the short vectors, a loop formed by the chain of the short vectors is picked up. The loop is a closed path formed by a chain of short vectors, the closed path being non-dense with respect to each other in the graph. Each loop (i.e., the closed path) picked up in this step S4 defines the closed region for stitching embroidery. The loop is picked up in accordance with the following procedure.

(1) Select the uppermost point defining short vectors in the graph, and set the selected point as a starting point Ps of the loop (closed path);

(2) Select a path directed to a left-handed direction with respect to the proceeding direction among a plurality of paths from the starting point to next points, and trance the path in the left-hand direction;

(3) Trace the path and memorize the traced path until the traced path returned to the starting point Ps: at a diverging point, the left-hand direction with respect to the proceeding direction is always selected;

(4) When the path returns to the starting point Ps, select a chain of the paths which have been stored until then as a new loop. Then, among the paths connected to the diverging points next to the starting point, the points belonging to the new loop are removed from the graph.

(5) If the graph is not empty, execute the above process from step (1).

FIGS. 9A through 9G show the above described procedure of selecting the loop.

In FIGS. 9A through 9G, marks X indicate the starting point Ps for each drawing, and arrows indicate the direction in which the paths are traced.

As shown in FIGS. 9A through 9G, seven loops L1 through L7 are selected. For simplifying the explanation, processing of a path having an open end is not described in the above explanation. If the line-drawn image includes a path having an open end, the above-described procedure for determining the closed loops is executed after such a path having the open end is removed from the graph. Between FIGS. 9E and 9F, the removal of the open end is executed, i.e., lines forming the stem of the flower (image pattern A) are deleted from the graph.

The loops L1 through L7 respectively consist of chains of short vectors representing closed regions (hatched portions of FIGS. 9A through 9G) which are to be embroidered.

In step S5 of FIG. 4, for each of the loops L1 through L7, attribution of the embroidery is determined. Items to be determined are, for example, the color of threads to be used for stitching the region surrounded by the path, what type of stitch is used for embroidering, whether the line stitch is to be made along the path, and the like.

In order to set the above items, each loop is displayed on the screen 7a one by one, and in response to the operation of the keys 11, the setting is applied to each loop (path and region).

Figure 10:
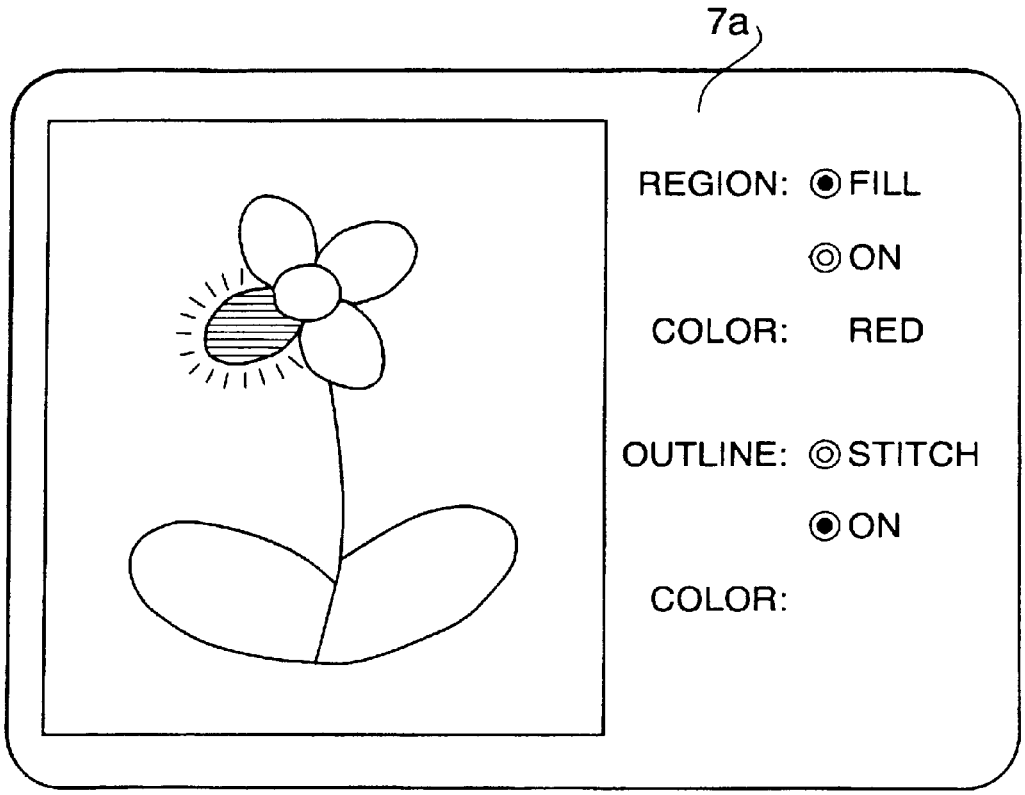
FIG. 10 is a screen image which is displayed when the attribution is applied to a loop.
Figure 11:
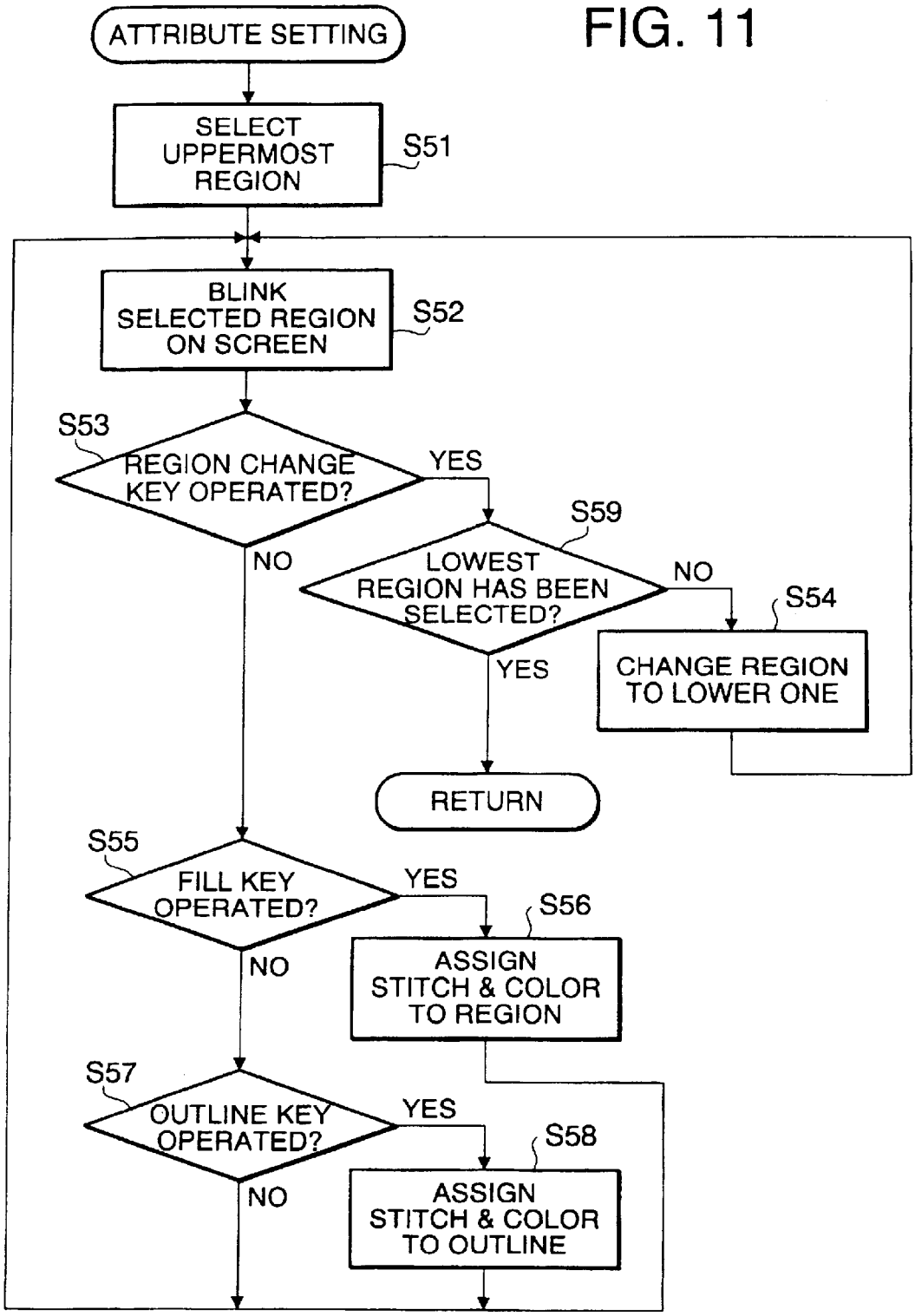
FIG. 11 is a flowchart illustrating the attribute setting procedure.

FIG. 10 shows an exemplary screen image when the above setting operation is performed. FIG. 11 is a flowchart illustrating the attribute setting procedure.

When the attribution is set, firstly the CPU 2 selects the uppermost region, i.e., the region defined by the loop L1 (FIG. 9A) as the region to which the attribution is applied (S51). In order to indicated which region is currently subjected to the attribution setting, the CPU 2 controls the region to blink (S52) on the screen 7a. For example, a case where the region defined by the loop L1 is filled with red stitch without stitching of the outline is explained.

Firstly, the operator depress the fill key 11b. Upon every depression of the fill key 11b, the setting to be applied to the indicated region is changed cyclicly from "without fill", "black fill", "red fill", "green fill", "yellow fill" and back to "without fill". In order to select the "red fill", the fill key 11b is to be depressed twice. Step S53 determines whether the region changing key 11a is depressed. Therefore, when the fill key 11b is depressed first, determination at step S53 is NO and control goes to step S55. At S55, whether the fill key 11b is depressed is examined. Therefore, determination at S55 is YES, and S56 is executed. At S56, as described above, the setting is changed. When the fill key 11b is depressed first time, "black fill" is selected.

Operation of the outline designation key 11c switches the setting of the stitch of the outline from "no-outline stitch", "black outline stitch", "red outline stitch", "green outline stitch", "yellow outline stitch" in this order, cyclicly (S57:YES and S58). Further operation of the outline designation key 11c brings the setting back to the "no-outline stitch". In the above described example, "no-outline stitch" is to be made. The initial setting is the "no-outline stitch", and therefore, the outline designation key 11c is not necessary to be operated (S57:NO). The setting of the outline stitch is indicated by a pair of cocentric circles with inner one being filled, on the screen 7a as shown in FIG. 10. The name of the item currently being set blinks on the screen 7a. In the embodiment, the outline is sewn with the zigzag stitch which is a default stitch.

In order to set the attribution of another region, the operator is required to operate the region change key 11a. When the region change key 11a is operated (S53:YES), another closed region, i.e., the region defined by the loop L2 in the embodiment, is selected (the region blinks on the screen 7a). In order to set "red fill" and "no outline", the fill key 11b is depressed twice (S55:YES and S56) as is done for the first region defined by the loop L1.

When the region switch key 11a is operated again (S53: YES), another region defined by the loop L3 is selected (S54). As the region defined by the loop L3 is selected, it blinks on the screen 7a (S52). In the example, the region defined by the loop L3 is to be set to be filled with yellow with black outline. For this setting, firstly the fill key 11b is operated three times to select yellow fill (S53:YES and S53). Then, the outline designation key 11c is operated once to set the black outline (S57:YES and S58).

Similar operations are repeatedly executed until setting for all the regions corresponding to the loop L1 through L8 are completed. After the setting for the region defined by the loop L7 is finished, when the region change key 11c is operated again (S53:YES and S59:YES), the attribution setting operation is finished.

Figure 12:
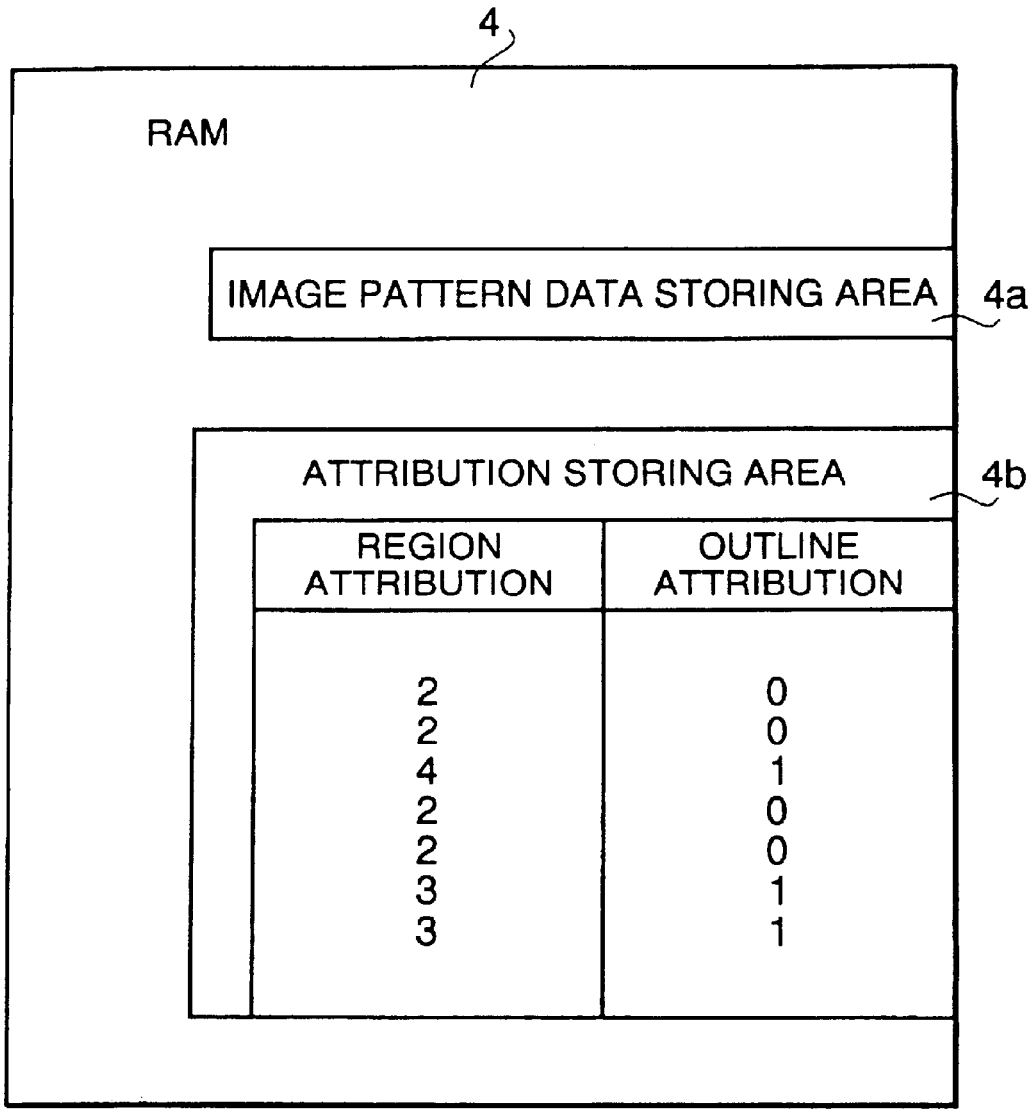
FIG. 12 shows data storing areas of RAM.

The settings are stored in the sewing condition storing area 4b of the RAM 4 as shown in FIG. 12. The sewing condition (i.e., the settings) are represented by numeral values for the outline and the region surrounded by the outline. The colors of stitch are represented by the following numerals.

| type of stitch | numeral |
|---|---|
| No stitch | 0 |
| Black stitch | 1 |
| Red stitch | 2 |
| Green stitch | 3 |
| Yellow stitch | 4 |

Therefore, the data stored in the sewing condition storing area 4b represents the setting as follows.

| | | |
|---|---|---|
| loop L1 | Fill (Red) | No outline |
| loop L2 | Fill (Red) | No outline |
| loop L3 | Fill (Yellow) | Outline (Black) |
| loop L4 | Fill (Red) | No outline |
| loop L5 | Fill (Red) | No outline |
| loop L6 | Fill (Green) | Outline (Black) |
| loop L7 | Fill (Green) | Outline (Black) |

Note that among the line-drawn image patterns, a stem part is not expressed by the short vector loop. The data corresponding to this part is not described in detail since the creating of the data corresponding to the part which is not expressed with use of short vectors is done according to another algorithm, and the embroidery data for such a part is created to have a predetermined type of stitch.

In the above described example, there is only one image in the original. If there are more than one images, each image is divided into the closed regions similarly to the above-described example, and the setting is done for each closed region.

By step S5 of FIG. 4, the regions of the image to be embroidered are determined. In step S6, the settings are converted into the embroidery data for use in sewing machines. That is, from the shape of each part or region of the image, stitching points data is created. For example, in order to create the embroidery data for a region to be filled, stitching points for filling the region which is defined by an outline, i.e., a loop formed by short vectors is sequentially created. An example of a method for creating the stitching points is described in the U.S. Pat. No. 5,181,176, and teachings of which are expressly incorporated herein by reference.

Figure 14:
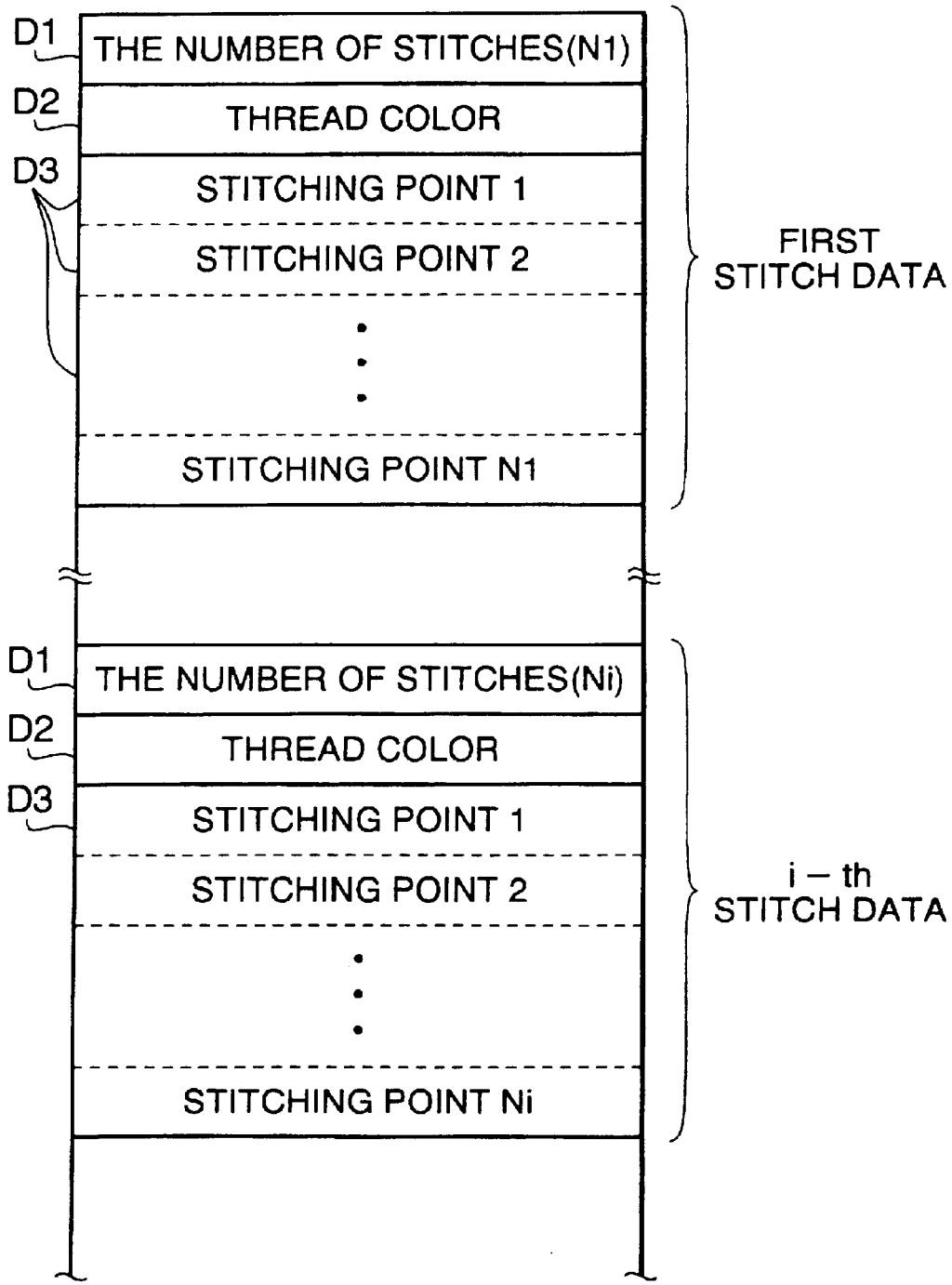
FIG. 14 shows a data structure of the embroidery data stored in the flash memory card.

For a path, along which a line stitch is produced, the stitching points data are created such that the stitching points are apart by a predetermined amount along the path. The color of the thread to be used for each region is stored as a thread color data in the flash memory 10 as shown in FIG. 14 through the flash memory device 5 together with the stitching points data. As shown in FIG. 14, the embroidery data includes the number of the stitching points (D1), a color code (D2) indicating the color of the thread, X and Y coordinates (D3) of each stitching point are stored for each stitch of the embroidery.

Figure 13:
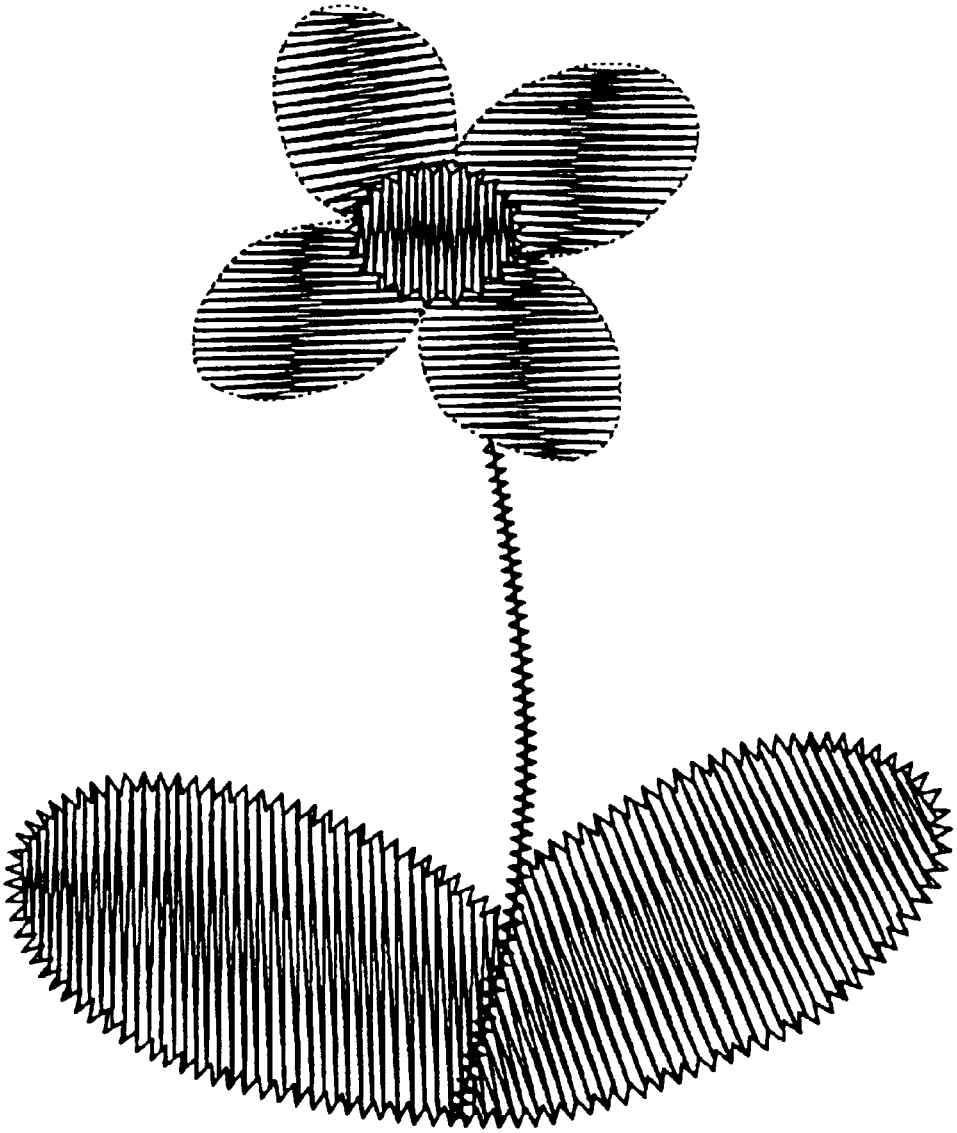
FIG. 13 is an example of an embroidery embroidered in accordance with the embroidery data, created by the embroidery creating device.

The embroidery data created as described above and stored in the flash memory 10 can be used in the sewing machine 40 as shown in FIG. 3. In FIG. 13, an example of the embroidery stitched by the sewing machine 40 in accordance with the embroidery data created as above is shown. Since the sewing machine 40 has a black and white display 46, the name of the color of a thread to be used is displayed. If the sewing machine has a color display device, it is possible to indicate the color of the thread by displaying the actual color.

According to the embroidery data creating device as described above, the thinning operation is performed with respect to a scanned line data, and further the line data is converted into a vector data. Since the vector data indicates the direction where each portion of the outline extends, when a region enclosed by an outline is elongated, the elongated direction can be recognized easily. As described before, in the prior art, since the elongated direction of the elongated region is not easily obtained, the direction of the stitch cannot be determined appropriately. According to the present invention, as the direction of the elongated region can be obtained, the direction of stitches for filling the region can be determined in accordance with the elongated direction. Therefore, according to the embroidery data creating device described above, a freely drawn line image can be used as an original for creating an embroidery data. The line-drawn image is automatically divided into a plurality of closed regions, and sewing condition can be set for each closed regions easily. No extra operation such as manual tracing for generating data to be input to a computer is necessary, and therefore an operator can obtain the desired embroidery data without particular knowledge of the data creating algorithm and/or particular skill therefor.

In the embodiment, the image scanner 12 is a monochrome scanner, and the color is assigned to each closed region on the screen after the image has scanned. However, it is also possible to use a color scanner to scan a color image, and used the color of the original image for designating the color of the embroidery data.

Further, when a color scanner is used, the embroidery data creating device is configured such that only images having a certain color are processed. That is, only a part of the image having a predetermined color can be made into the embroidery data.

The original data is not limited to the data input from the scanner. The original data may be given through a floppy disk, a card memory, through communication lines, and the like.

In the embodiment, the thin line image is vectorized and then the loops are determined. Picking up of the loops may be performed with reference to a bit map image without vectorizing the image data.

Figure 15:
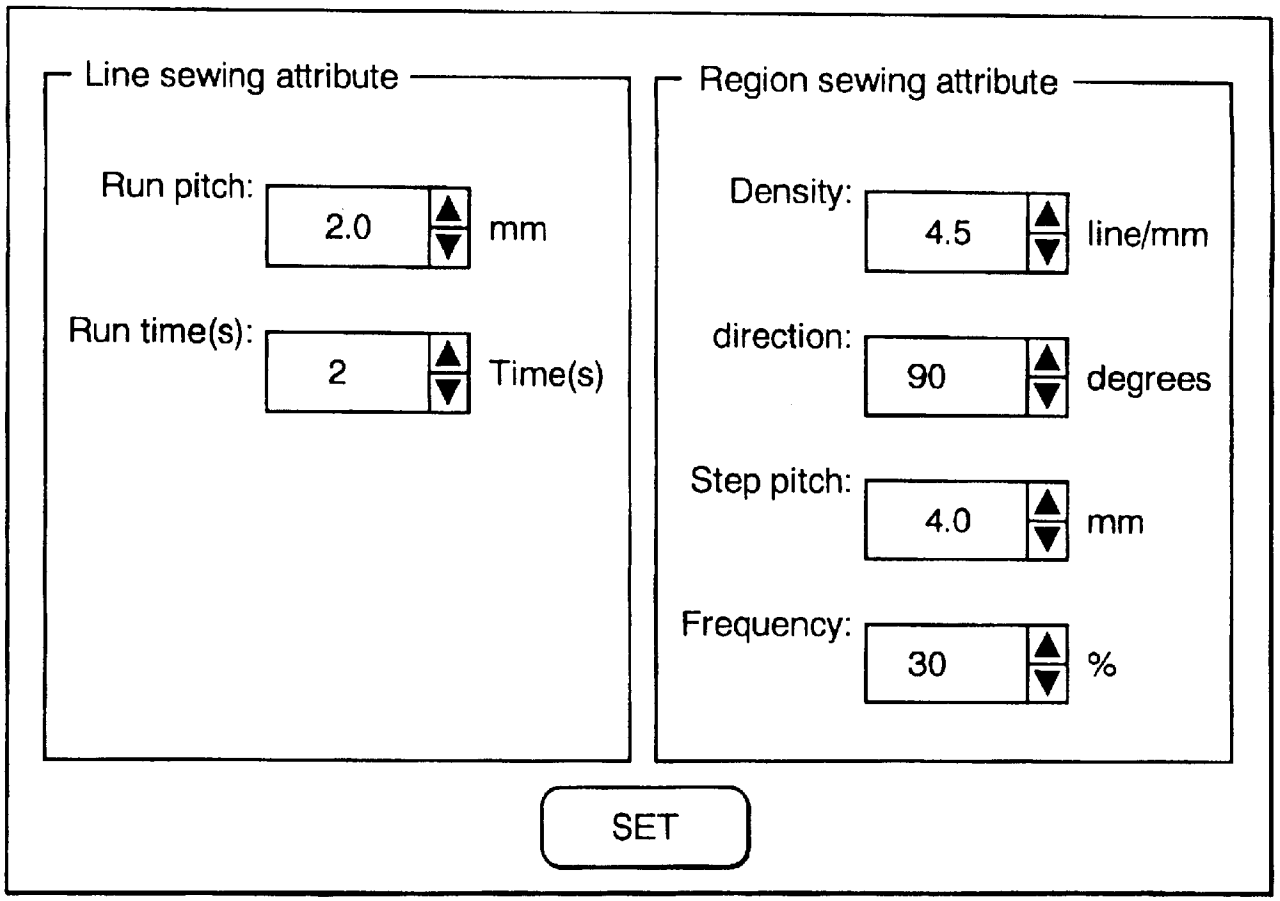
FIG. 15 is a screen image for setting various attribution data at a time.
Figure 16A:
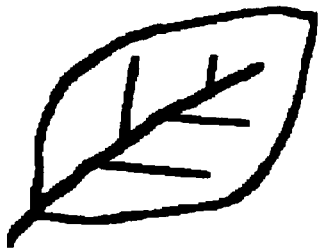
FIG. 16A PRIOR ART
FIGS. 16A, 16B and 16C are exemplary images for illustrating problems of prior art.
Figure 16B:
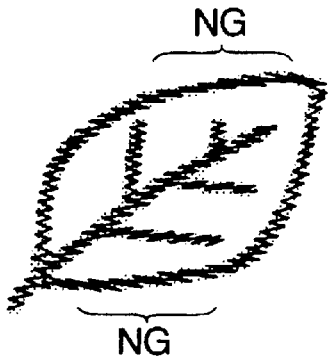
FIG. 16B PRIOR ART
Figure 16C:
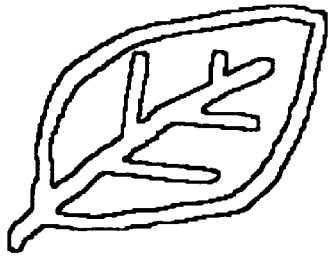
FIG. 16C PRIOR ART
Figure 16D:
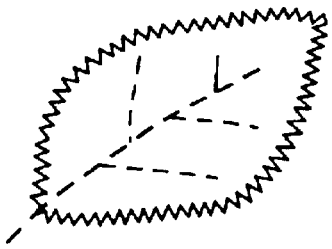
FIG. 16D is an image illustrating the embroidery which is procuded in accordance with the embroidery data crated by the embroidery creating device according to the present invention.

Further, in step S5 of FIG. 4, the embodiment can be modified such that the sewing condition can be set in more detailed manner. For example, the number of types of the embroidery, the density of the stitching, the direction of the stitching, the pitch of the stitching are made adjustable. In such a case, it is preferable to show a window menu as shown in FIG. 15. The operator can easily set various items with use of the window shown in FIG. 15. The settings are fixed when the operator selects the set button in the window.

In the embodiment, a hand held scanner is employed. However, the invention is not limited to the described embodiment, but can be modified in various way. For example, instead of the hand held scanner, a desk top scanner can be employed. In the embodiment, in order to change the region to which the attribute is assigned the region change key is to be operated. It is possible to designate the region directly if the embroidery data creating device is provided with a pointing device such as a mouse. In this case, designation of region is performed quickly and the operability of the embroidery data creating device may improve.

Further, the created embroidery data is transmitted to the sewing machine by means of the flash memory. If there is means for connecting the sewing machine and the embroidery data creating device directly (wired or wireless), the created embroidery data can be used without the recording medium such as the flash memory.

The present disclosure relates to subject matters contained in Japanese Patent Applications No. HEI 7-224965, filed on Sep. 1, 1995, and No. HEI 8-102286, filed on Apr. 24, 1996, which are expressly incorporated herein by reference in their entireties.

What is claimed is:

1. An embroidery data creating device for creating embroidery data to be used by a sewing machine, said embroidery data creating device comprising:

means for storing image data corresponding to a line-drawn image;

means for applying a thinning operation to said image data to obtain a thin line image;

means for determining closed paths based on said thin line image;

means for selecting at least one of a path and a region defined by said path for each of said closed paths determined by said determining means; and means for converting said at least one of said path and said region defined by said path into said embroidery data.

2. The embroidery data creating device according to claim 1, wherein said converting means comprises means for assigning an attribution to said at least one of said path and said region defined by said path when conversion is executed.

3. The embroidery data creating device according to claim 2, wherein said attribution includes a type of stitch to be used for producing an embroidery.

4. The embroidery data creating device according to claim 2, wherein said attribution includes a color of thread to be used for producing an embroidery.

5. The embroidery data creating device according to claim 2, wherein said attribution includes a pitch of each stitch for embroidering.

6. The embroidery data creating device according to claim 2, wherein said attribution includes a density of stitches for embroidering.

7. The embroidery data creating device according to claim 2, wherein said attribution includes a direction of stitch for embroidering.

8. The embroidery data creating device according to claim 1, wherein said image data is bit map image data consisting of data for a plurality of pixels, and wherein a pixel connectivity of said thin line obtained by said [obtaining] *applying* means is eight.

9. The embroidery data creating device according to claim 1, wherein said determining means converts said thin line image into a chain of connected vectors, said closed path being defined as a path surrounded by said chain of connected vectors.

10. The embroidery data creating device according to claim 1, further comprising means for storing said embroidery data in a memory means.

11. The embroidery data creating device according to claim 10, wherein said memory means is a detachable card memory.

12. The embroidery data creating device according to claim 1, wherein said determining means traces a path from a predetermined point along a predetermined direction, and if said predetermined point is reached during the tracing of said path, said determining means determines that said path is a closed path.

13. The embroidery data creating device according to claim 1, wherein said means for selecting includes means for displaying said path and said region.

14. A method for creating embroidery data to be used by a sewing machine, said method comprising the steps of:

storing image data corresponding to a line-drawn image;

applying a thinning operation to said image data to obtain a thin line image;

determining closed paths based on said thin line image;

selecting at least one of a path and a region defined by said path for each of said determined closed paths; and converting said at least one of said path and said region defined by said path into said embroidery data.

15. The method according to claim 14 wherein said determining step includes tracing a path from a predetermined point along a predetermined direction, and if said predetermined point is reached during the tracing of said path, making a determination that said path is a closed path.

16. The method according to claim 15 wherein said determining step further includes converting said thin line image into a chain of connected vectors, said closed path being defined as a path surrounded by said chain of connected vectors.

17. A computer readable memory medium for a computer program, said memory medium comprising a computer program, said computer program providing a method for creating embroidery data to be used by a sewing machine comprising the steps of:

storing image data corresponding to a line-drawn image;

applying a thinning operation to said image data to obtain a thin line image;

determining closed paths based on said thin line image;

selecting at least one of a path and a region defined by said path for each of said determined closed paths; and converting said at least one of said path and said region defined by said path into said embroidery data.

18. The computer readable memory medium of claim 17 wherein in said method provided by said computer program said determining step includes tracing a path from a predetermined point along a predetermined direction, and if said predetermined point is reached during the tracing of said path, making a determination that said path is a closed path.

19. The computer readable memory medium of claim 18 wherein in said method provided by said computer program said determining step further includes converting said thin line image into a chain of connected vectors, said closed path being defined as a path surrounded by said chain of connected vectors.

*20. An embroidery data processor for preparing sewing data of an embroidery pattern based on image data of the embroidery pattern, the embroidery data processor reducing thickness of lines in the image data to produce thin-line image data including at least one thin-line outline defining a bounded region corresponding to a region of the embroidery pattern, and*

*extracting the bounded region defined by the at least one thin-line outline.*

*21. A method for preparing sewing data of an embroidery pattern based on image data of the embroidery pattern comprising:*

*reducing thickness of lines in the image data to produce thin-line image data including at least one thin-line outline that defines a bounded region corresponding to a region of the embroidery pattern; and*

*extracting the bounded region defined by the at least one thin-line outline.*

* * * * *